July 11, 1967 S. GOLUB ET AL 3,330,700

SOLAR-CELL PANELS

Filed June 17, 1963

2 Sheets-Sheet 1

EDWARD A. SEQUEIRA
SEYMOUR GOLUB
INVENTOR.

BY Allen E. Botney

ATTORNEY

EDWARD A. SEQUEIRA
SEYMOUR GOLUB
INVENTOR.

BY Allen E. Botney

ATTORNEY

United States Patent Office 3,330,700

Patented July 11, 1967

3,330,700

SOLAR-CELL PANELS

Seymour Golub, Reseda, and Edward A. Sequeira, Temple City, Calif., assignors to Electro-Optical Systems, Inc., Pasadena, Calif.

Filed June 17, 1963, Ser. No. 288,128

1 Claim. (Cl. 136—89)

The present invention relates to a new and improved method and new and improved structural elements for the interconnection of solar cells in the fabrication of solar-cell panels.

The method presently employed in the fabrication of solar-cell panels is still in a rather rudimentary stage in that a relatively large number of steps are involved, some of which are cumbersome and require meticulous attention to detail. Furthermore, because of the method used, solar-cell panels produced today have not attained the desired degree of reliability.

It is, therefore, an object of the present invention to provide a method for interconnecting solar cells that will expedite the process of fabricating solar-cell panels.

It is another object of the present invention to provide a technique by means of which solar-cell panels can be fabricated having a higher degree of reliability than those in the prior art.

It is a further object of the present invention to provide structural means for simplifying the process of manufacturing solar-cell panels.

The novel features of the invention, together with further objects and advantages thereof, will be better understood from the following description considered in connection with the accompanying drawings in which.

Figures 3, 4:
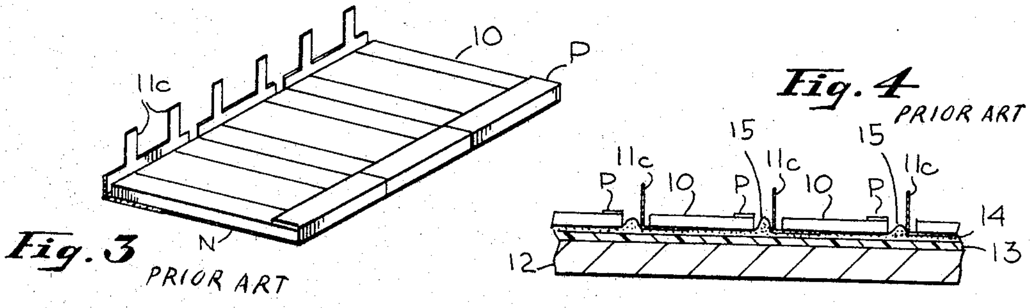
FIGURE 3 illustrates the manner in which a row of solar cells are mounted on the tab shown in FIG. 2.
Figure 5:
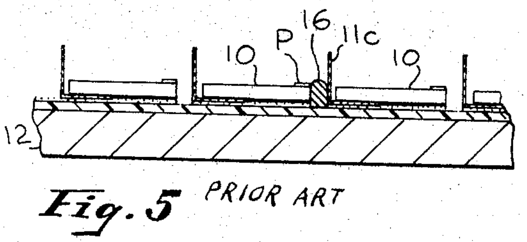
Fig. 5 PRIOR ART
Figure 6:
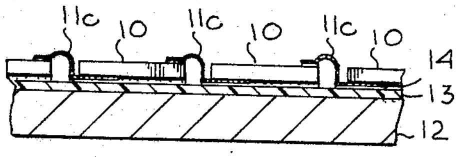
Fig. 6 PRIOR ART
Figure 7:
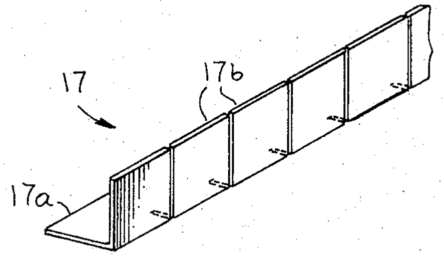
Figure 8:
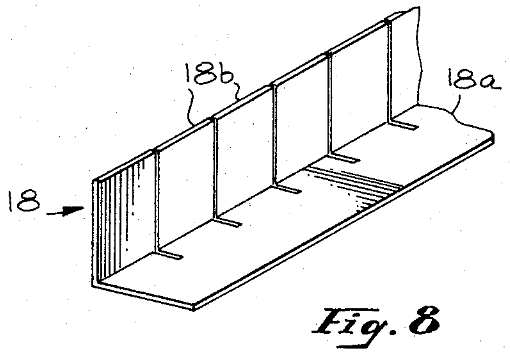
Figure 9:
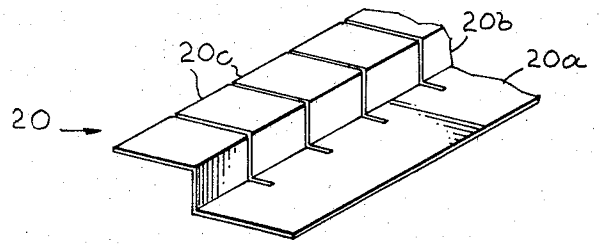

FIGURES 4, 5 and 6 present cross-sectional views of portion of a solar-cell panel for the purpose of illustrating the final steps involved in the present-day method for fabricating solar-cell panels;

FIGURES 7, 8 and 9 respectively illustrate several new kinds of tabs used in accordance with the present invention for fabricating solar-cell panels.

Figures 10, 11, 12:
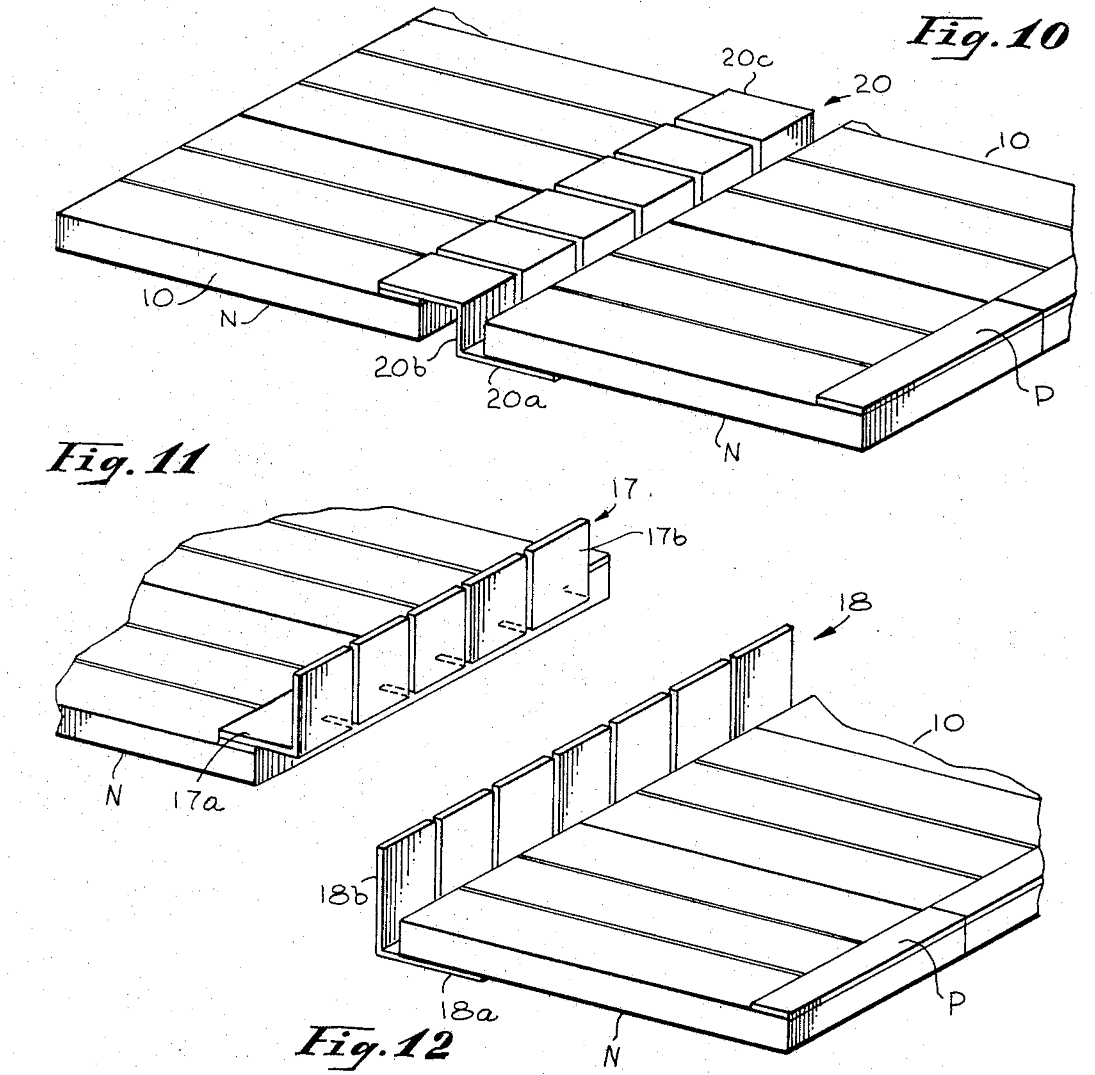
Figure 13:
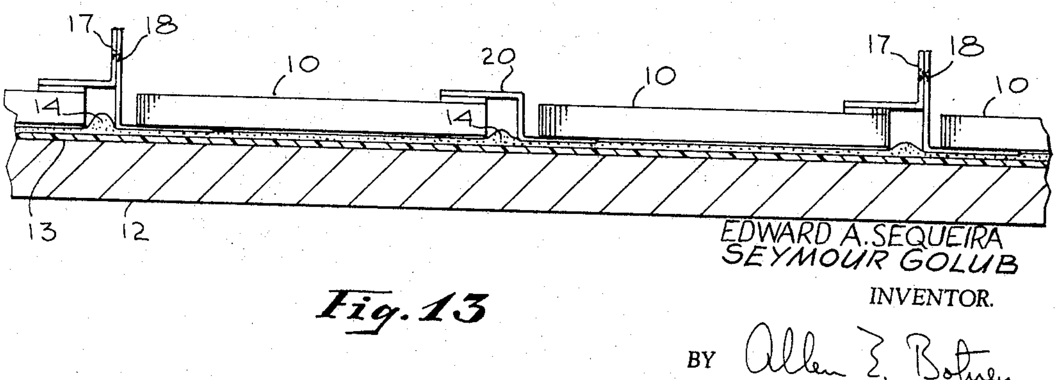

FIGURE 10 illustrates the manner in which two rows of solar cells are mounted on the tab shown in FIG. 9;

FIGURE 11 illustrates the manner in which the tab shown in FIG. 7 is mounted on a row of solar cells;

FIGURE 12 illustrates the manner in which a row of solar cells are mounted on the tab shown in FIG. 8; and FIGURE 13 presents a cross-sectional view of a portion of a solar-cell panel fabricated in accordance with the method of the present invention.

Figure 1:
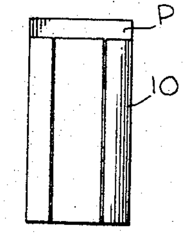
Fig. 1 PRIOR ART
FIGURE 1 is a top view of a solar cell.
Figure 2:
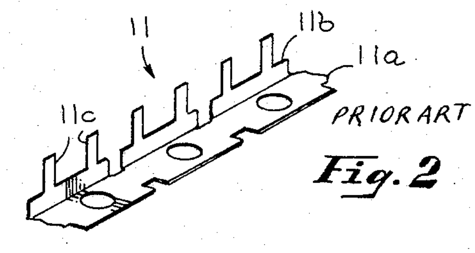
FIGURE 2 is a tab element used today in interconnecting a plurality of solar cells.

Reference is now made to the drawings for a detailed description of the invention. However, in order that the subject invention may be fully appreciated and in order to distinguish it over the prior art, it is deemed essential to first present a detailed description of the method and apparatus now being employed in the fabrication of solar-cell panels. Accordingly, for this purpose, reference is made to FIGS. 1 through 6 wherein the current technique is illustrated. A top view of a standard solar cell 10 is shown in FIG. 1 and, as shown therein, the top surface of the cell has a narrow and thin strip of solder, commonly referred-to as the P layer, along one of its two shorter edges. The bottom surface of the solar cell, on the other hand, which cannot be seen in the figure because of the particular view presented, is entirely covered with a thin layer of solder that is commonly referred-to as the N layer. A tab element, generally designated 11, is shown in FIG. 2. The tab element is made of a metal that will hold solder and is L-shaped, the base and upright portions of the element respectively being designated 11*a* and 11*b*, the latter portion being cut out to form a plurality of fingers 11*c* that extend upwardly. Although not mandatory, it is preferred that the height of upright portion 11*b* be approximately equal to the thickness of a solar cell.

A row of solar cells 10 and a tab element 11 are combined in the manner shown in FIG. 3 to form a fundamental unit or array in the over-all panel assembly. More particularly, as many solar cells as a tab element will accomodate are placed on the tab element so that the bottom sides of the cells, that is to say, their N layers, rest on and against base 11*a*. As is known by those familiar with this art, the N layers of the solar cells are soldered to base 11*a* to form the fundamental array mentioned earlier.

Reference is now made to FIG. 4 wherein a solar-cell panel is shown to include a substrate 12, customarily made of metal to provide the desired degree of strength, an insulating layer 13 over the substrate that is preferably made of an epoxy glass laminate, and an adhesive layer 14 by means of which the abovesaid fundamental arrays can be cemented to the insulating layer beneath it. While a number of different kinds of adhesive material are available, a silastic material is preferred. Several parallel arrays of solar cells are also shown in FIG. 4 and it will be noted that between these rows, the adhesive material has risen to about the height of the solar cells. These mounds of adhesive material are designated 15 and are produced when a downward pressure is applied to the cells to insure that they will be firmly bonded in position. At this point attention is directed to the fact that the P layers in one cell array face fingers 11*c* in the adjacent cell array.

The next step in this prior-art process being described is that of bending the fingers of one array so that they come into contact with the P layers of the adjacent array. Toward this end, a curling iron 16 is used, the curling iron being nothing more than a thin cylindrical rod which is placed between rows of cells during the bending operation, is is shown in FIG. 5. In order to properly position curling iron 16 between the rows and thereby obtain the desired bending of fingers 11*c*, it is first necessary to clean away mounds 15 that were previously formed between these rows. Once mounds 15 have been cleaned away and curling iron 16 placed in position between rows of solar cells, fingers 11*c* are curled or bent over the iron until they come into contact with the P layer in the adjacent row, at which time these fingers are soldered to the P layers. The curling iron is then removed. This step is repeated until all the rows of solar cells in the panel are interconnected as is shown in FIG. 6. The panel is now complete.

Thus, because the use of a curling iron is required (element 16 in FIG. 5) and, furthermore, due to the fact that the adhesive material (mounds 15 in FIG. 4) must be removed from between the rows of solar cells so as to permit the introduction of the curling tool therebetween, it is seen that the technique currently employed is both cumbersome and time-consuming, as was previously mentioned. In addition, during the soldering operation in which fingers 11*c* in one row are soldered to the P layers in the adjacent row, tiny solder balls are formed due to the fact that the solder tends to collect around the heat source. These tiny solder balls drop down between the rows of cells and stick to the solidified resin flux that has also formed during the soldering operation. If not cleaned out, shorting and corrosion will very likely occur. It will also be recognized that during each tab soldering operation, solar cells may become damaged because of the continued application of heat to the fingers resting on the P layers of the cells. As a final disadvantage, the curling of the fingers introduces a spring action into them, with the result that some of the already soldered fingers may spring back from the P layers during a soldering operation. In this way, poor or bad connections may be produced that, in turn, may later result in open contacts.

As will be seen from the detailed description of the present invention that follows, the present invention substantially if not entirely eliminates the above-enumerated disadvantages of the technique currently employed in the solar panel field. Accordingly, reference is now made to FIGS. 7, 8 and 9 wherein three new kinds of tab elements used in the practice of the present invention are respectively shown. The tab element in FIG. 7, which is generally designated 17, is L-shaped in appearance, its base being designated 17*a* and its upright portion, which has been sliced or cut at equal intervals to provide vibration strain relief, is designated 17*b*. The tab element shown in FIG. 8 is also L-shaped and is generally designated 18, its base portion being designated 18*a* and its upright portion, which is likewise sliced or cut to provide vibration strain relief, is designated 18*b*. Thus, tab elements 17 and 18 are similar, the only differences between them being one of dimension, that is to say, base 18*a* is preferably somewhat wider than base 17*a* and upright slices 18*b* are of somewhat greater height, roughly about the thickness of a solar cell, than slices 17*b*. As for the tab element in FIG. 9, it is generally designated 20 and resembles the letter Z in the alphabet. Thus, tab element 20 is made up of three parts respectively designated 20*a*, 20*b* and 20*c*, parts 20*a* and 20*c* being parallel to each other and part 20*b* extending perpendicularly between the two. For the reason previously mentioned, namely, to provide vibration strain relief, parts 20*b* and 20*c* are also sliced or cut as is shown in the figure.

The manner in which these tab elements are used is illustrated in FIGS. 10, 11 and 12. In FIG. 10, for example, two rows of solar cells 10 are shown interconnected by means of tab element 20. One row of cells rests on base portion 20*a* with its N layers in contact with the base whereas the other row of solar cells are placed so that their P layers are in contact with member 20*c*. In these positions, base 20*a* is soldered to one row of cells and member 20*c* is soldered to the second row of cells, thereby forming a single mechanical unit or structure made up of two rows of solar cells that are electrically interconnected by means of tab element 20 which interconnects the P layers in one row with the N layers in the other row. In FIG. 11, tab element 17 is shown mounted on still another row of solar cells 10, the mounting of the tab element being accomplished by soldering base portion 17*a* to the P layers on the solar cells. Finally, in FIG. 12, a fourth row of solar cells 10 is shown mounted on tab element 18, the mounting being achieved here by soldering base portion 18*a* to the N layers of the solar cells.

Having described the construction of the three basic solar-cell units, the manner in which they are used in fabricating a solar-cell panel is illustrated in FIG. 13 wherein a cross-sectional view of a portion of a solar-cell panel is shown. Here, too, the panel includes a metal substrate 12, an insulating layer 13 over the substrate, and a layer of adhesive material 14 on the insulating layer. As shown in the figure, the abovesaid solar-cell units rest on the adhesive layer and are bonded thereto, the units being arranged so that upright portion 17*b* of tab element 17 is in face-to-face relationship with upright portion 18*b* of tab element 18. When this is done, the slices or cuts of upright portions 17*b* and 18*b* that face each other are spot welded or spot soldered together. When this has been done throughout the entire panel assembly, the fabrication of a panel in accordance with the present invention is then complete.

The advantages of the present invention over the prior art should be obvious. Thus, by practicing the present invention, the step of cleaning the space between rows of cells is eliminated nor is it necessary, furthermore, to employ a curling iron or tool as before. Also eliminated by the present invention is the "spring back" action of the tab fingers which, in the past, resulted in the poor connections that subsequently produced open contacts. It should also be obvious that use of the present invention is less likely to cause damage to any of the solar cells and, in addition, is less cumbersome and time consuming and, therefore, is less expensive to practice.

Although a particular embodiment of the invention has been illustrated above by way of example, it is not intended that the invention be limited thereto. Accordingly, the invention should be considered to include any and all modifications, alterations or equivalent arrangements falling within the scope of the annexed claim.

Having thus described the invention, what is claimed is:

A solar-cell panel comprising: a base structure that includes a metal substrate, an insulating layer over said substrate, and a layer of adhesive material over said insulating layer; an array of four rows of solar-cells mounted in parallel with one another on said layer of adhesive material, the cells being arranged so that the P-layers of one row of cells are adjacent the N-layers of the next row of cells; a Z-shaped metal strip electrically connected between the adjacent P and N layers of the two inside rows of solar-cells, the upper portion of said Z-shaped strip being cut through between cells to provide vibration strain relief for the cells connected thereto; and first and second pairs of L-shaped metal strips for electrically interconnecting the two inside rows of cells with the two outer rows of cells, the upright portions of each pair of L-shaped strips being joined together and the base portions thereof being electrically connected to the P and N layers, respectively, of adjacent rows of cells, the upright portions of each pair of L-shaped strips being cut through between cells to provide vibration strain relief for the cells connected thereto, the upright portions of the L-shaped strips that are connected to the N-layers of the cells being longer than the upright portions of the L-shaped strips that are connected to the P-layers of the cells.

References Cited

UNITED STATES PATENTS

| | | | |
|---|---|---|---|
| 2,428,537 | 10/1947 | Veszi | 317—234 |
| 2,777,975 | 1/1957 | Aigrain. | |
| 2,992,539 | 7/1961 | Curtis. | |
| 2,999,302 | 9/1961 | Beukema | 29—155.5 |
| 3,070,699 | 12/1962 | Lehmann | 250—203 |
| 3,094,439 | 6/1963 | Mann | 136—89 |
| 3,187,414 | 8/1965 | Hugle | 29—155.62 |

WILLIAM I. BROOKS, *Primary Examiner.*

WHITMORE A. WILTZ, *Examiner.*